Dec. 31, 1929. M. KREHER 1,741,524
POWER TRANSMISSION MECHANISM
Filed Oct. 7, 1927 2 Sheets-Sheet 1

Inventor:
Max Kreher,
By Paul E. Schilling,
atty.

Dec. 31, 1929.                M. KREHER                1,741,524
                       POWER TRANSMISSION MECHANISM
                       Filed Oct. 7, 1927        2 Sheets-Sheet 2

Inventor:
Max Kreher,
By Paul P. Schilling
        atty.

Patented Dec. 31, 1929

1,741,524

UNITED STATES PATENT OFFICE

MAX KREHER, OF FREIBERG, GERMANY

POWER-TRANSMISSION MECHANISM

Application filed October 7, 1927, Serial No. 224,613, and in Germany May 25, 1927.

The subject of my invention is an improved fluid clutch or power transmission mechanism for use in driving without the employment of the usual toothed transmission gearing, whereby shocks are obviated and wear and tear essentially reduced. With the new invention, moreover, the change of speed is not restricted to definite stages (for instance three or four), there being continuous, evenly progressive transition between the minimum and maximum limits. The construction is characterized by great simplicity.

The accompanying drawings illustrate several constructional forms of the invention.

Figure 1:
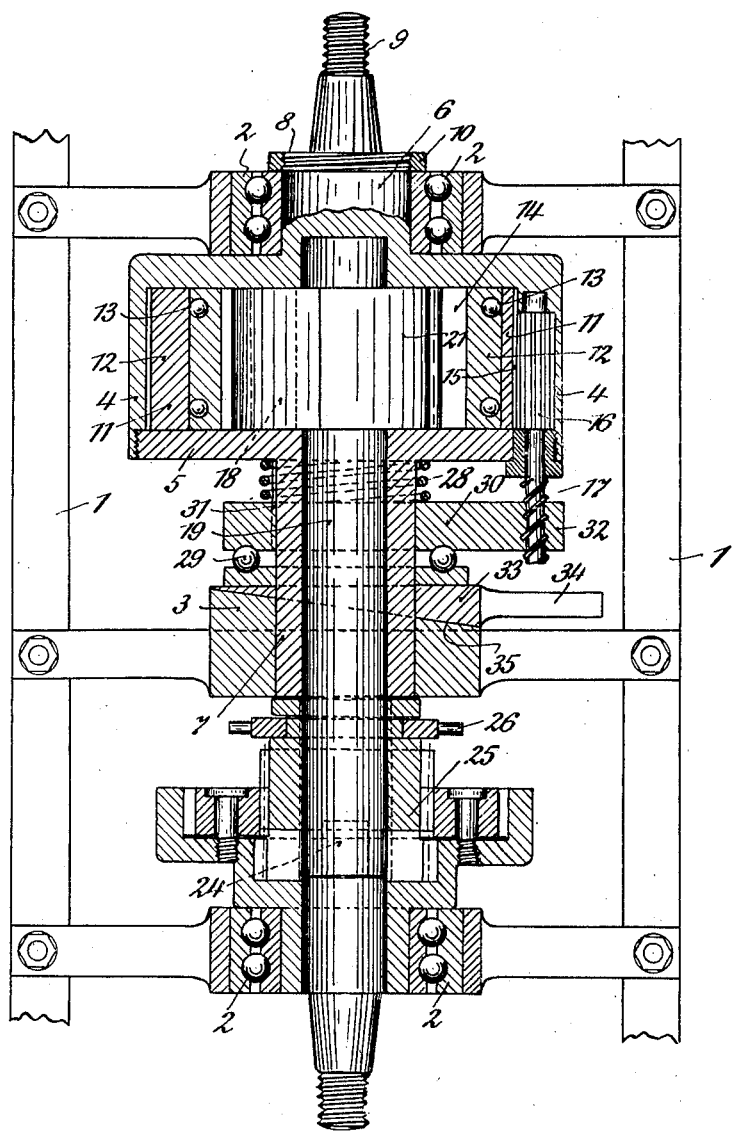
Fig. 1 is a sectional plan of the first form of construction.

The frame 1 shown in Fig. 1 is constituted by longitudinal rails, connected by cross-bars, the outer of which latter carry ball-bearings 2, whilst the intermediate cross-bar supports a bearing 3 presenting an inclined plane. The power transmission mechanism is mounted in the said bearings and consists of a casing 4 having at one side a hub 6, and closed at its opposite side by a screw-cover 5 having a hub 7. The hub 6, which is threaded at 8 to receive a fixing-nut 10, terminates in a screw-pin 9 and lies in one ball-bearing 2, while the hub 7 is supported by the central bearing. The casing 4 is bored excentrically and is furnished with two bushings or lining-rings 11, 12, between which are the bearing-balls 13. The ring 12 is centric, while the ring 11 is excentric and in the position of rest balances the excentricity of the casing, so that a centric chamber 14 is formed. The ring 11 is provided with teeth 15 with which there meshes a pinion 16, whose spindle is furnished with a worm 17. Within the chamber 14, which contains oil or other suitable fluid, there is located the rotary head 18, mounted on the shaft 19. This head presents recesses 20, each adapted to accommodate a snugly fitting bucket or vane 21, turning on a pin 22 and pressed firmly against the ring 12 by a spring 23.

The shaft 19 consists of two parts, a pin 24 on the one part entering a corresponding recess in the other part, the two parts being coupled by gear 25, which can be shifted for right or left-hand motion by an operating-lever 26. The shaft terminates in a screw-pin similar to the screw-pin 9. On the hub 7 are two collars 30, 33, which are pressed by a spring 28 against the inclined plane face 35 of the bearing 3. Between these two collars there is located the ball-bearing 29. The collar 30 is coupled to the hub 7 by means of a feather and groove 31, so as to permit of longitudinal sliding; and it is furnished with an eye, having a worm-thread, at 32, to receive the worm 17. The other collar 33, which is loosely mounted, is provided with a handle-lever 34 and its inclined face engages the inclined face 35 of the bearing 3.

Figure 2:
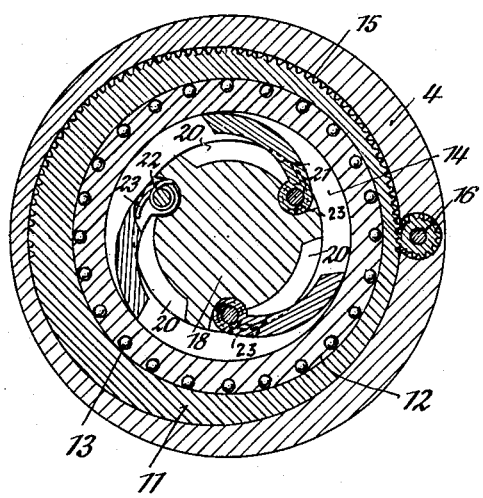
Figs. 2 and 3 are cross-sections through the casing showing the parts in different operative positions.
Figure 3:
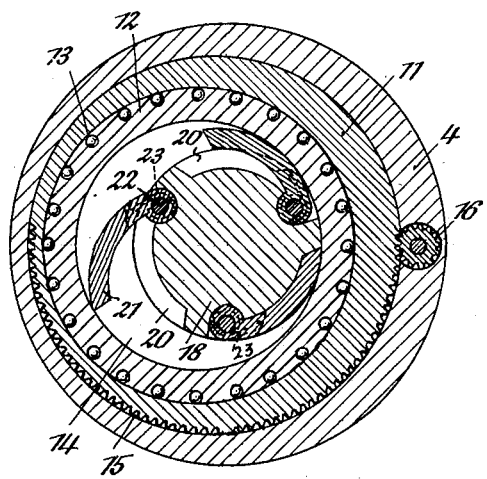

The motor may be coupled at the pin 9 and the driven mechanism at the other screw-pin, such however not being shown in the drawing. The motor then drives the casing 4, with its rings 11, 12 and these rotate round the chamber 14, in which the oil and the head 18 remain at rest so long as the chamber occupies the centrical position shown in Fig. 2. If, however, the excentric ring 11 is rotated by means of the pinion 16, the chamber 14 will assume an excentric position and the oil will be carried round and acting upon the vanes 21, which constitute a resistance, will rotate the head 18 and shaft 19. Such rotation commences slowly and increases likewise quite gradually, the transition being thus evenly progressive and unaccompanied by shocks. The position of the parts shown in Fig. 3 is that of maximum rotative action. Actuation of the pinion 16 is effected by turning the collar 33, which will ascend the inclined plane 35 of bearing 3, whereby rotation of the worm 17 results.

Figure 4:
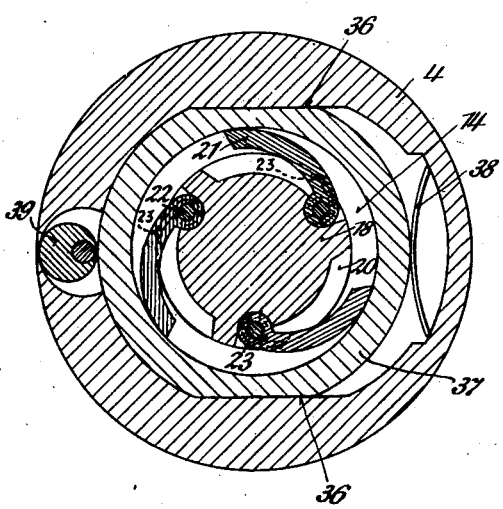
Figs. 4 and 5 are like cross-sectional views illustrating a modification.
Figure 5:
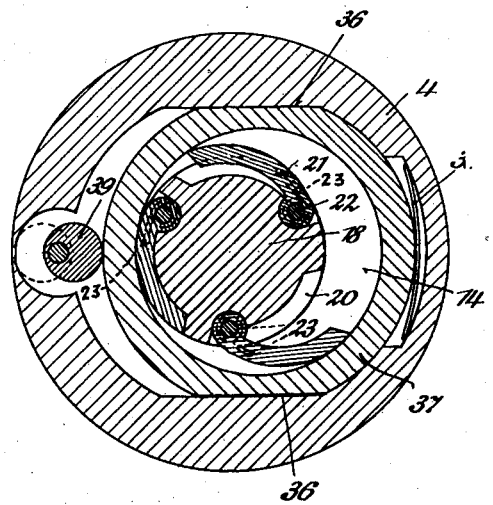

In the construction shown in Figs. 4 and 5 the excentrically bored casing 4 is provided with a bushing or lining-ring 37, which in the normal position of the parts constitutes a centrical chamber 14. The ring 37 is acted upon by a spring 38 and presents flattened faces which slide on the correspondingly flat walls 36 of the casing 4. Excentricity of the chamber 14, with consequent rotative action in the manner already described, is brought about by shifting the ring 37 by means of an excentric 39.

It will be obvious that instead of the described arrangement the principle might be reversed, the motor driving the rotary head 18 while the casing 4 is coupled with the driven mechanism.

Having thus described my invention, what I claim is—

1. In a power transmission mechanism, in combination, a rotatable casing, a concentrically bored chamber therein, containing a fluid, a centrically located rotatable head in said chamber and provided with spring-actuated vanes which bear against the encompassing wall of the chamber, a shaft carrying the said head and protruding from the casing, and means between the chamber and the casing for shifting the chamber from a centric to an excentric position in the casing.

2. In a power transmission mechanism, in combination, a rotatable excentrically bored casing, a centrically bored adjustable chamber in said casing containing a fluid, a rotatable head located in the said chamber, centrically of the casing, and provided with spring-actuated vanes which bear against the chamber-wall, a shaft carrying the said head and protruding from the casing, an eccentric between the chamber and the casing for diametrally shifting the chamber, and operating means for said eccentric.

3. In a power transmission mechanism, in combination, a rotatable excentrically bored casing, an adjustable lining-ring therein having an excentric bore and a second lining-ring having a centric bore inserted in the first said ring and confining a fluid, a rotatable head provided with spring-actuated vanes located within the inner ring, against whose wall the vanes press, a shaft carrying the said head and protruding from the casing, and means for turning the outer ring and thus altering the position of the inner one diametrally.

4. In a power transmission mechanism, in combination, a rotatable excentrically bored casing, an adjustable peripherally toothed lining-ring therein having an excentric bore, and a second lining-ring having a centric bore inserted in the first said ring and confining a fluid, a rotatable head provided with spring-actuated vanes located within the inner ring, against whose wall the vanes press, a shaft carrying the said head and protruding from the casing, a pinion meshing with the said toothed outer ring, and means for operating the said pinion and thus causing it to turn the outer ring and alter the position of the inner one diametrally.

5. In a power transmission mechanism, in combination, a rotatable excentrically bored casing having a hub, an adjustable peripherally toothed lining-ring having an excentric bore located in the casing, and a second lining-ring having a centric bore inserted in the first said ring and confining a fluid, a cover closing the casing and having a hub, a shaft journaled in the latter, a head mounted on the shaft within the said inner ring and provided with spring-actuated bucket-vanes which press against the encompassing wall, a pinion meshing with the said toothed outer ring and having a worm-threaded spindle, a bearing for the cover-hub presenting an inclined plane, an operable collar on the hub having a correspondingly inclined face and a spring-actuated collar on the hub, presenting a threaded eye to receive the worm threaded spindle and pressing the first said collar against the plane.

In testimony whereof I affix my signature.

MAX KREHER.